Patented July 7, 1925.

1,545,171

UNITED STATES PATENT OFFICE.

KARL FRIEDRICH AUGUST SCHULZ, OF DUSEDAU, GERMANY.

HOLDING DEVICE FOR THE REAR WHEEL OF BICYCLES AND MOTOR CYCLES.

Application filed June 3, 1924. Serial No. 717,504.

*To all whom it may concern:*

Be it known that I, KARL FRIEDRICH AUGUST SCHULZ, a citizen of the German Republic, residing at Dusedau, Germany, have invented certain new and useful Improvements in Holding Devices for the Rear Wheels of Bicycles and Motor Cycles, of which the following is a specification.

The axle of the rear wheel is held in motorcycles and bicycles by a separate holding device in a slot of the cheek so that it can be easily removed from the cheek of the bicycle frame in forward or in rearward direction. These holding arrangements comprise adjusting devices designed to adjust the wheel axle with regard to the driving wheel in accordance with the length of the bicycle chain. It has already been proposed to use holding devices, the wheel axle holding part proper of which is adapted to be oscillated in upward direction together with the adjusting spindle so that the adjusting device remains attached to the cheek when the wheel is being removed, said adjusting device being merely raised in oscillating around a bearing. These arrangements require however the provision of a bearing in the cheek of the frame so that this cheek is weakened.

This invention avoids these inconveniences by connecting the holding device proper, viz the holding fork which embraces the axle of the rear wheel, at the end of the spindle instead of fixing the same rigidly on this spindle, the holding fork being thus adapted to be oscillated in upward direction without the spindle.

An embodiment of the invention is shown by way of example on the accompanying drawing, in which:—

Figure 1:
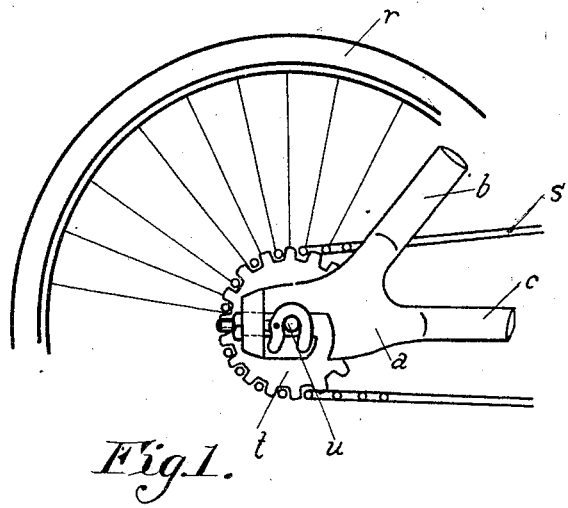
Fig. 1 shows in side elevation the holding fork, the chain wheel and rear wheel being merely indicated.
Figure 2:
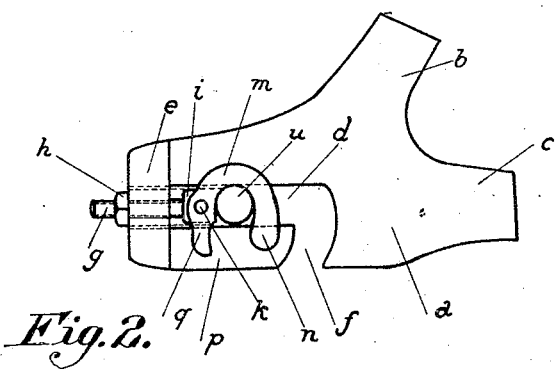
Fig. 2 shows, on larger scale than Fig. 1, the holding fork with the wheel hub mounted in the same.
Figure 3:
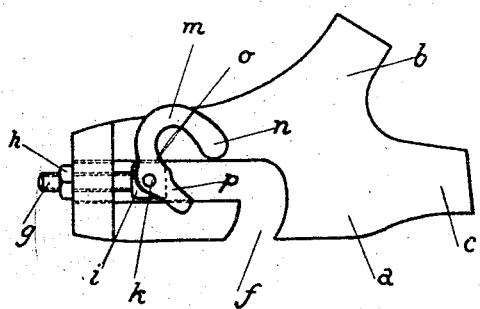
Fig. 3 shows the holding fork as it is shown in Fig. 2, the wheel hub being however removed.

The cheek $a$ forms as usual a flat extension of the fork $b$, $c$ of the frame and it has a horizontal slot $d$ the front end of which is bent in downward direction and extends to the lower edge of the cheek. At the rear end of the cheek $a$ an end piece $e$ is fixed which is traversed by a screw bolt $g$ on which a nut $h$ is screwed. The bolt $g$ has at the front end a head $i$ which fits into the slot $d$ and carries a pin $k$ on which the holder for the wheel axle $a$ is pivotally mounted. This holder is composed of a curved arm $m$ having two end pieces $n$ and $q$.

When the wheel axle $u$ is being inserted into the vertical arm $f$ of the slot in the cheek $a$ and then pushed back in the horizontal arm $d$ of said slot it comes in contact with the end piece $q$ of the holder and makes this holder pivot around pin $i$ so that its front end $n$ is lowered and shuts off the entrance to the slot $d$. The wheel axle $u$ acts at first upon the concave surface $p$ of the end piece $q$ and later on, when the holder $m$ has been lowered it bears against the concave surface $o$ of said holder.

I claim:—

A holding device for the rear wheel of bicycles or motorcycles comprising in combination with a cheek at the rear end of the frame fork provided with a slot designed to receive the wheel axle, a horizontal screw bolt screwed into the rear end of said cheek, a nut for securing said bolt in position, a head at the front end of said bolt fitting in said slot of the cheek, a pivot pin on said bolt head, and a curved holder pivotally mounted on said pivot pin and designed to be lowered onto and securely hold the wheel axle when this axle is being inserted into said slot.

In testimony whereof I affix my signature in presence of two witnesses.

KARL FRIEDRICH AUGUST SCHULZ.

Witnesses:
 WLAD. ENDEE,
 ROY T. ANSPEN.